(12) United States Patent
Tanaka et al.

(10) Patent No.: US 8,137,453 B2
(45) Date of Patent: Mar. 20, 2012

(54) FIBER REINFORCED CONCRETE AND METHOD OF MANUFACTURING FIBER REINFORCED CONCRETE MEMBER

(75) Inventors: Yoshihiro Tanaka, Tokyo (JP); Jun Sakamoto, Tokyo (JP)

(73) Assignee: Taisei Corporation, Tokyo (JP)

( * ) Notice: Subject to any disclaimer, the term of this patent is extended or adjusted under 35 U.S.C. 154(b) by 838 days.

(21) Appl. No.: 11/795,847

(22) PCT Filed: May 12, 2005

(86) PCT No.: PCT/JP2005/008724
§ 371 (c)(1),
(2), (4) Date: Jul. 23, 2007

(87) PCT Pub. No.: WO2006/082665
PCT Pub. Date: Aug. 10, 2006

(65) Prior Publication Data
US 2008/0163794 A1    Jul. 10, 2008

(30) Foreign Application Priority Data
Feb. 2, 2005   (JP) ................. 2005-026377

(51) Int. Cl.
*C04B 14/38* (2006.01)
(52) U.S. Cl. ......... 106/644; 106/705; 106/713; 106/737
(58) Field of Classification Search .................. 106/644, 106/713, 705, 737
See application file for complete search history.

(56) References Cited

U.S. PATENT DOCUMENTS

| | | | | |
|---|---|---|---|---|
| 4,780,141 | A * | 10/1988 | Double et al. | 106/38.3 |
| 6,478,867 | B1 * | 11/2002 | Cheyrezy et al. | 106/644 |
| 6,723,162 | B1 * | 4/2004 | Cheyrezy et al. | 106/644 |
| 6,887,309 | B2 * | 5/2005 | Casanova et al. | 106/644 |
| 7,641,731 | B2 * | 1/2010 | Chanut et al. | 106/644 |
| 2004/0050302 | A1 * | 3/2004 | Casanova et al. | 106/640 |

FOREIGN PATENT DOCUMENTS

| | | |
|---|---|---|
| JP | 5-310459 | 11/1993 |
| JP | 11-246255 | 9/1999 |
| JP | 2001-220201 | 8/2001 |

OTHER PUBLICATIONS

EP 1258465 (Nov. 20, 2002) Septfons et al. abstract only.*
JP 2001220188 (Aug. 14, 2001) Kodama et al. abstract only.*

* cited by examiner

*Primary Examiner* — Paul Marcantoni
(74) *Attorney, Agent, or Firm* — Kratz, Quintos & Hanson, LLP

(57) ABSTRACT

Fiber reinforced concrete is generated by including fiber in a dispersed manner in a cement matrix including: cement; first pozzolanic reactant particles having a high activity; second pozzolanic reactant particles having an activity lower than the first pozzolanic reactant particles; first aggregate particles having a maximum particle diameter smaller than or equal to 2.5 mm, a mean particle diameter within a range of 0.4 mm to 0.8 mm and a fineness modulus within a range of 1.5 to 3.5; second aggregate particles having a maximum particle diameter smaller than or equal to 0.425 mm, a mean particle diameter within a range of 0.1 mm to 0.3 mm and a fineness modulus within a range of 0.4 to 0.8; at least one type of plasticizer; and water.

12 Claims, 3 Drawing Sheets

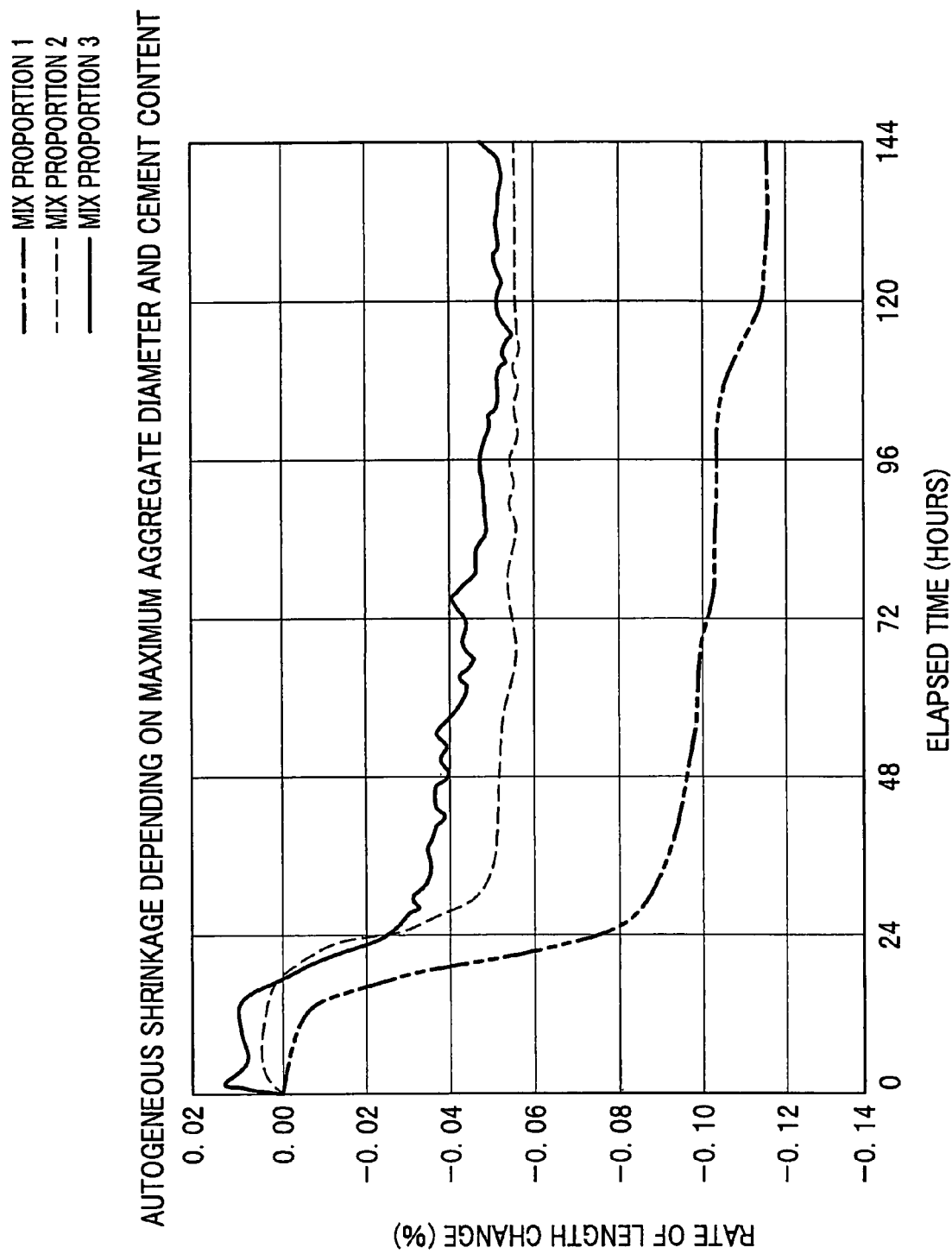

FIBER REINFORCED CONCRETE AND METHOD OF MANUFACTURING FIBER REINFORCED CONCRETE MEMBER

FIELD OF THE INVENTION

The present invention relates to fiber reinforced concrete, which is manufactured by mixing fiber into a cement matrix, and a manufacturing method of a fiber reinforced concrete member.

BACKGROUND OF THE INVENTION

In recent years, in the fields of civil engineering and construction, ultra-high-strength fiber reinforced concrete has been applied to a variety of concrete structures for the purpose of thinning and weight saving of a member, and enhancement of design freedom and enhancement of durability.

Conventionally, for example, as disclosed in Japanese Laid-open Patent Application No. H11-246255 (paragraphs [0031] to [0077]) or Japanese Laid-open Patent Application No. H05-310459 (paragraphs [0004] to [0011] and FIGS. 1 to 6), such fiber reinforced concrete is elaborated by mixing metallic fiber having a diameter of 0.16 mm-0.3 mm and a length of approximately 10 mm-18 mm in a cement matrix, which is manufactured by including aggregate having a maximum aggregate particle diameter smaller than or equal to 1 mm-2 mm and pozzolanic reactant powder as principal components and using a super plasticizer therefor, by a ratio R ($=L_m/D_{max}$) of a mean length $L_m$ of fiber to a maximum aggregate particle diameter $D_{max}$ larger than or equal to 10-20 and a volume of 1%-4% (see Patent Document 1 or 2, for example).

SUMMARY OF THE INVENTION

Problems to be Solved by the Invention

Conventional fiber reinforced concrete, however, has a constraint on particle diameter distribution of aggregate particles in a small mean particle diameter. It is therefore necessary to mix several types of silica sand having different particle diameter distributions by an appropriate mix proportion in order to obtain aggregate which satisfies this constraint and, therefore, the material cost is high in comparison with a case of obtaining fine aggregate such as normal fine sand.

Moreover, conventional fiber reinforced concrete, which includes significant fine particle aggregate having a maximum aggregate particle diameter smaller than or equal to 1 mm-2 mm and has a large cement content to the aggregate, has a problem that autogeneous shrinkage is increased even though a large cement content to the aggregate contributes to enhancement of the fluidity characteristics (fluidity performance of concrete necessary for construction) and mechanical characteristics (yield strength or the like necessary for a concrete member). Here, autogeneous shrinkage means the phenomenon of volume decrease and shrinkage due to volume decrease of hydrate in comparison with the volume of cement and water before hydration reaction, which is caused by hydration reaction thereof. Therefore, autogeneous shrinkage starts to occur when cement undergoes hydration reaction and setting starts, in concrete having a large unit cement content. Accordingly, since autogeneous shrinkage which occurs at an early age is restrained when a structure for restraining shrinkage such as a formwork exists, tensile strain remains inside concrete and, as a result, the initial cracking strength of the cement matrix lowers.

Moreover, conventional fiber reinforced concrete, which includes significant fine particle aggregate having a maximum aggregate particle diameter smaller than or equal to 1 mm-2 mm, has a problem that the shear transfer capacity, which contributes to enhancement of the shear yield strength of a member, lowers. That is, asperity is formed by aggregate particles at an occurrence face of a shear crack to be generated at a concrete member (which may be hereinafter referred to simply as "a shear crack face") and a mechanism for transferring shear force by this asperity is formed while the shear transfer capacity may be decreased when a diameter of the aggregate particles is small and asperity is not formed.

Furthermore, since the ratio R of the mean length $L_m$ of fiber to the maximum aggregate particle diameter $D_{max}$ is larger than or equal to 10-20, the mean length $L_m$ of fiber may be increased, the flow value indicative of workability of concrete may be decreased and ensuring of necessary fluidity may be impossible, depending on the maximum aggregate particle diameter $D_{max}$.

The present invention has been made for solving such problems, and it is an object thereof to provide fiber reinforced concrete realizing superior mechanical performance, durability performance and workability at low material cost and a manufacturing method of a fiber reinforced concrete member.

Means for Solving the Problems

In order to solve the above problems, there is provided fiber reinforced concrete according to the present invention, wherein fiber is included in a dispersed manner in a cement matrix. The cement matrix includes: cement; first pozzolanic reactant particles having a high activity; second pozzolanic reactant particles having an activity lower than the first pozzolanic reactant particles; first aggregate particles having a maximum particle diameter smaller than or equal to 2.5 mm, a mean particle diameter within a range of 0.4 mm to 0.8 mm and a fineness modulus within a range of 1.5 to 3.5; second aggregate particles having a maximum particle diameter smaller than or equal to 0.425 mm, a mean particle diameter within a range of 0.1 mm to 0.3 mm and a fineness modulus within a range of 0.4 to 0.8; at least one type of super plasticizer; and water.

Such fiber reinforced concrete, for which so-called fine sand commonly used for concrete is adjusted and used as aggregate, can be obtained easily and the unit cost thereof is low and, therefore, it becomes possible to generate ultra-high-strength fiber reinforced concrete at a low price in comparison with conventional fiber reinforced concrete.

Moreover, since fine sand having a comparatively large particle diameter such as the maximum particle diameter $D_{max}$ smaller than or equal to 2.5 mm is used as aggregate, asperity due to fine sand is formed at a crack face and, therefore, it becomes possible to enhance shear transfer at the shear crack face and to establish a concrete structure having superior shear yield strength.

The aforementioned fiber reinforced concrete according to the present invention may be characterized in that a weight ratio of water to the cement is within a range of 20% to 24%, a ratio of a mean length of the fiber to a maximum diameter of aggregate particles composed of the first aggregate particles and the second aggregate particles (i.e, maximum aggregate particle diameter) is smaller than 10, and an amount of the fiber to a total volume after setting is smaller than 4%.

With such fiber reinforced concrete, it becomes possible to ensure fluidity even for a small amount of water and to enhance the workability in concrete casting, by setting the ratio $L_m/D_{max}$ of the mean length $L_m$ of fiber to the maximum aggregate particle diameter $D_{max}$ smaller than 10.

The aforementioned fiber reinforced concrete according to the present invention may be characterized in that the fiber has a length larger than or equal to 2 mm and a ratio of a length to a diameter of the fiber larger than or equal to 20.

With such fiber reinforced concrete which uses comparatively long fiber having an individual length Li thereof larger than or equal to 2 mm and a ratio Li/d of a length to a diameter d of fiber (which may be hereinafter referred to simply as "a fiber diameter") larger than or equal to 20, bond resisting force between the fiber and the cement matrix is increased and a bridging effect in cracking can be expected. Accordingly, tensile stress by the bridging effect of fiber can be expected and high toughness ability can be obtained even when the cracking width is increased after initial cracking of the cement matrix. That is, it becomes possible with the fiber reinforced concrete of the present invention to obtain high fracture energy.

The aforementioned fiber reinforced concrete according to the present invention may be characterized in that a weight ratio of the water to a total weight of the cement, the first pozzolanic reactant particles and the second pozzolanic reactant particles is within a range of 10% to 15%, and a $D_{75}$ grading is within a range of 50 μm to 300 μm and a $D_{50}$ grading is within a range of 10 μm to 70 μm, of grading components of the mixture composed of the cement, the first pozzolanic reactant particles, the second pozzolanic reactant particles, the first aggregate particles and the second aggregate particles.

With such fiber reinforced concrete, since cement, first pozzolanic reactant particles and second pozzolanic reactant particles are mixed by the predetermined particle diameter distribution and mix proportion amount to construct the cement matrix, the cumulative grading distribution of the material particles becomes smooth and closest packing is achieved between the respective particles. Therefore, the cement matrix has a dense structure having no pore and the cement hydrate and the fine aggregate are bonded stably and, as a result, the initial tensile strength of the matrix itself is enhanced.

The aforementioned fiber reinforced concrete according to the present invention may be characterized in that a weight ratio of the cement to the mixture composed of the cement, the first pozzolanic reactant particles, the second pozzolanic reactant particles, the first aggregate particles and the second aggregate particles is within a range of 30% to 40%, a weight ratio of pozzolanic reactant material composed of the first pozzolanic reactant particles and the second pozzolanic reactant particles to the mixture composed of the cement, the first pozzolanic reactant particles, the second pozzolanic reactant particles, the first aggregate particles and the second aggregate particles is within a range of 20% to 40%, and a weight ratio of aggregate composed of the first aggregate particles and the second aggregate particles to the cement is within a range of 80% to 130%.

With such fiber reinforced concrete, it becomes possible to control the autogeneous shrinkage so as to be small, by decreasing the ratio of cement to the mixture to 30%-40%. That is, considering that the autogeneous shrinkage, which is the phenomenon caused by shrinkage of volume of hydrate due to hydration reaction of cement and water, occurs at a mix proportion including large unit cement content, the autogeneous shrinkage of the fiber reinforced concrete of the present invention is restrained by decreasing the unit cement content.

Furthermore, the aforementioned fiber reinforced concrete according to the present invention may be characterized in that a weight ratio of the first aggregate particles to the mixture composed of the cement, the first pozzolanic reactant particles, the second pozzolanic reactant particles, the first aggregate particles and the second aggregate particles is within a range of 30% to 50%.

With such fiber reinforced concrete, since the skeleton of aggregate is formed of the first aggregate particles having a weight ratio to the mixture of 30%-50%, it becomes possible to reduce the autogeneous shrinkage amount.

According to another aspect of the present invention, there is provided a method of manufacturing a fiber reinforced concrete member. The method includes: (1) a mixing step of mixing: cement; first pozzolanic reactant particles having a high activity; second pozzolanic reactant particles having an activity lower than the first pozzolanic reactant particles; first aggregate particles having a maximum particle diameter smaller than or equal to 2.5 mm, a mean particle diameter within a range of 0.4 mm to 0.8 mm and a fineness modulus within a range of 1.5 to 3.5; second aggregate particles having a maximum particle diameter smaller than or equal to 0.425 mm, a mean particle diameter within a range of 0.1 mm to 0.3 mm and a fineness modulus within a range of 0.4 to 0.8; at least one type of super plasticizer; water; and fiber to generate fiber reinforced concrete; (2) a casting step of casting the mixed fiber reinforced concrete at a predetermined location; and (3) a curing step of curing the cast fiber reinforced concrete, and is characterized in that the curing step includes first curing to be performed with a formwork being attached until a predetermined strength develops and second curing to be performed with the formwork being detached after the first curing.

When the second curing is performed in a temperature environment of 60° C.-95° C. for 48 hours-72 hours, silica or alumina of pozzolanic reactant particles and free lime in cement are bonded by this heat treatment and, therefore, it suitably becomes possible to form a stable and hard substance at an early stage and to make the texture of the cement matrix dense.

Other features and advantages of the present invention will be apparent from the following description.

BRIEF DESCRIPTION OF THE DRAWINGS

FIG. 3 is a graph showing verification experiment result of autogeneous shrinkage.

BEST MODES FOR CARRYING OUT THE INVENTION

Figure 1:
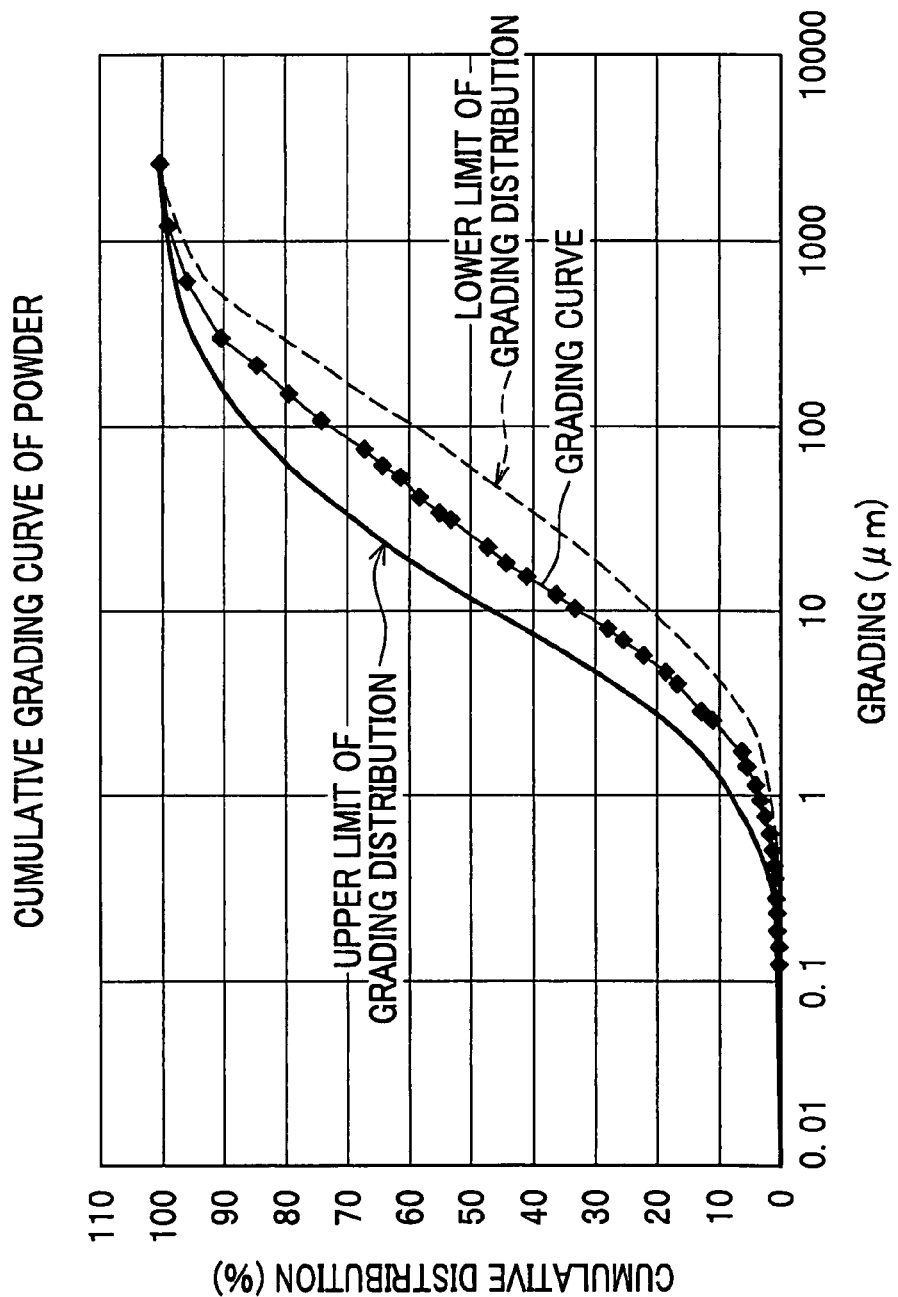
FIG. 1 is a graph showing a cumulative grading curve of powder material according to one embodiment of the present invention.

Fiber reinforced concrete according to the present invention is elaborated by mixing (8) fiber into a cement matrix obtained by mixing (1) cement, (2) first pozzolanic reactant particles having a high activity, (3) second pozzolanic reactant particles having an activity lower than the first pozzolanic reactant particles, (4) first aggregate particles, (5) second aggregate particles, (6) super plasticizer and (7) water.

Detailed description will be given to each material used for the fiber reinforced concrete according to the present invention.

(1) Cement

Used for the cement is low-heat portland cement or moderate-heat portland cement having a particle diameter within a range of 0.5-100 μm, a mean particle diameter within a range of 4-18 μm and a specific surface area of cement particles by blaine of 2000-4000 cm$^2$/g. It should be noted that the type of cement is not limited and, for example, ordinary portland cement, high-early-strength portland cement, sulfate-resistant portland cement or the like may be used, though this embodiment uses low-heat portland cement or moderate-heat portland cement including little aluminate component which tends to absorb a super plasticizer.

It should be noted that the weight ratio of the cement content to powder material composed of the cement, the first pozzolanic reactant particles, the second pozzolanic reactant particles, the first aggregate particles and the second aggregate particles is within a range of 30%-40%.

(2) First Pozzolanic Reactant Particles

Used for the first pozzolanic reactant particles having a high activity is silica fume having a particle diameter D of 0.05-50 μm (suitably $0.5 < D \leq 50$ μm), a mean particle diameter of 0.15-3.00 μm, a median diameter $D_{50}$ of 0.5-5 μm and a specific surface area of reactant particles by blaine of 150,000-300,000 cm$^2$/g. Here, the material to be used for the first pozzolanic reactant particles is not limited to silica fume and, in addition, a compound selected from derivatives of kaolin, precipitated silica, classified fly ash or the like may be used.

(3) Second Pozzolanic Reactant Particles

Used for the second pozzolanic reactant particles having an activity lower than the first pozzolanic reactant particles is pozzolanic reactant particles composed of fly ash, blast furnace slag, volcanic ash, silica sol, stone dust or the like having a particle diameter D of 0.1-50 μm (suitably $15 < D \leq 50$ μm), a mean particle diameter of 4-10 μm, a median diameter $D_{50}$ of 2-11 μm and a specific surface area of reactant particles by blaine of 3,000-7,500 cm$^2$/g.

Here, the first pozzolanic reactant particles and the second pozzolanic reactant particles (which may be hereinafter referred to simply as "pozzolanic reactant particles" when the "first pozzolanic reactant particles" and the "second pozzolanic reactant particles" are not distinguished) are impalpable powder to be involved in the pozzolanic reaction, and make the cement matrix dense by the micro filler effect and cement dispersion effect of fine particles including cement and attribute enhancement of durability and enhancement of compressive strength and tensile strength. It should be noted that the pozzolanic reaction is a reaction in which the pozzolanic substance reacts with the alkaline substance generated by hydration reaction of cement to gradually become a hardening body, and contributes to long-term and stable strength development.

It should be noted that, in this embodiment, in order to decrease the cement content to reduce the autogeneous shrinkage and the water-cement ratio by including many pozzolanic reactant particles, pozzolanic reactant particles of 60-85 parts by weight are mixed for cement of 100 parts by weight and the weight ratio of the pozzolanic reactant particles to powder material composed of cement, first pozzolanic reactant particles, second pozzolanic reactant particles, first aggregate particles and second aggregate particles is made within a range of 20%-40%.

(4) First Aggregate Particles

Used for the first aggregate particles is hard fine sand having a maximum particle diameter $D_{max}$ smaller than or equal to 2.5 mm, a mean particle diameter of 0.4 mm-0.8 mm, a fineness modulus of 1.5-3.5 and a small water absorption rate. Here, the type of fine sand to be used for the first aggregate particles is not limited, and may be obtained from, for example, sea sand, river sand, crushed sand or the like composed of andesite, volcanic rock and quartzite.

(5) Second Aggregate Particles

Used for the second aggregate particles is quartz powder which is fine sand having a maximum particle diameter $D_{max}$ smaller than or equal to 0.425 mm, a mean particle diameter of 0.1 mm-0.3 mm and a fineness modulus of 0.4-0.8. Here, the type of fine sand to be used for the second aggregate particles is not limited, and may be obtained from silica sand, amorphous quartz, opaline silica-containing powder, cristobalite powder, volcanic ash, rock powder or the like, in addition to quartz powder.

It should be noted that the weight ratio of the total weight of aggregate composed of the first aggregate and the second aggregate to a weight of cement is within a range of 80%-130%. Moreover, the weight ratio of the weight of the first aggregate to the total weight of the cement, the first pozzolanic reactant particles, the second pozzolanic reactant particles, the first aggregate particles and the second aggregate particles is within a range of 30%-50%.

Here, the mix proportion of powder material composed of the cement, the first pozzolanic reactant particles, the second pozzolanic reactant particles, the first aggregate particles and the second aggregate particles is, as shown in FIG. 1, a mix proportion which satisfies the upper limit of the grading distribution of a case where $D_{75}$ grading is approximately 50 μm and $D_{50}$ grading is approximately 10 μm and the lower limit of the grading distribution of a case where $D_{75}$ grading is approximately 30 μm and $D_{50}$ grading is approximately 70 μm and gives a smooth grading curve. It should be noted that FIG. 1 is a graph showing a cumulative grading curve of powder material according to this embodiment.

(6) Plasticizer

Used for the plasticizer is so-called super plasticizer, which is water-soluble vinyl copolymer having phenoxyl group and carbonyl group, such as acrylate, methallyl sulfonate, lignosulfonate, polynaphthalin sulfonic acid alkali metal salt or polycarboxylic acid alkali metal salt. Moreover, the plasticizer to be used may be of one type or several types.

(7) Water

Water is introduced to give a weight ratio to the total weight of the cement and the pozzolanic reactant particles of 10%-15%. Moreover, water is introduced to give a weight ratio of water to the cement of 20%-24%.

(8) Fiber

Used for the fiber is one having a ratio of a length to a fiber diameter larger than or equal to 20, a length at least larger than or equal to 2 mm and a mean length of approximately 10-25 mm. Moreover, a ratio $L_m/D_{max}$ of a mean length $L_m$ of fiber to a maximum aggregate particle diameter $D_{max}$ is smaller than 10.

Moreover, the mixed amount of fiber is an amount to give a fiber volume which is smaller than 4% of the concrete volume after setting and, more preferably, smaller than 3.5%.

According to this embodiment, fiber may be arbitrarily selected from known fiber such as high tensile steel fiber having a tensile strength of approximately 2000-3000 N/mm$^2$, amorphous steel fiber or stainless fiber. It should be noted that fiber plated with non-ferrous metal such as copper, zinc or nickel may be used.

The shape of fiber is not limited, and one having a deformative cross section may be used in addition to a modified cross section such as a circular cross section, rectangular cross section or polygonal cross section. For example, in order to enhance the adhesive force between the fiber and the cement matrix, one having a modified cross section of fiber being twisted or transformed into waveform, one having a hooked end portion or one shaped in so-called dog-horn form having a crushed end portion may be used. Moreover, one having variational roughness of fiber in the longitudinal direction of the fiber or one having a variational sectional area of fiber may be used. Furthermore, fiber may be integrated by weaving several pieces of fiber into cable form, braiding or twisting.

Next, description will be given to a method of manufacturing a fiber reinforced concrete member according to this embodiment.

Fiber reinforced concrete member is manufactured by a mixing step, a casting step and a curing step.

Mixing Step

The mixing step includes: a dry mixing step of mixing a powder part of cement matrix; a wet mixing step of introducing water and super plasticizer into the powder part mixed by the dry mixing step and mixing the same; and a fiber mixing step of introducing fiber into the cement matrix mixed by the wet mixing step and mixing the same.

In the dry mixing step, (1) cement, (2) first pozzolanic reactant particles, (3) second pozzolanic reactant particles, (4) first aggregate particles and (5) second aggregate particles, which correspond to the powder part of the cement matrix, are mixed in a dry state. The method or means for mixing the respective materials in the dry mixing step is not limited, and one arbitrarily selected from known methods and means may be performed.

In the wet mixing step, after mixing of the powder part of the cement matrix is completed, water, super plasticizer and the like, which correspond to the liquid part of the cement matrix, are introduced and mixed to develop a predetermined fluidity of the cement matrix. It should be noted that the mixing method or means in the wet mixing step is not limited, and one arbitrarily selected from known methods and means may be performed.

In the fiber mixing step, fiber is introduced into the cement matrix, which has obtained a predetermined fluidity by the wet mixing step, and further mixed. It should be noted that the mixing method or means in the fiber mixing step is not limited, and one arbitrarily selected from known methods and means may be performed.

Casting Step

The cement matrix (fiber reinforced concrete) including fiber mixed by the mixing step is cast at a predetermined location by known means.

Curing Step

After concrete casting, the first curing is performed in a temperature environment of 20° C.-45° C. for 18 hours-48 hours. When a predetermined strength develops after the first curing, formwork is removed and second curing is performed. As the second curing, the steam curing is performed in a temperature environment of 60° C.-95° C. for 48 hours-72 hours. It should be noted that the second curing is not limited to the steam curing, and the curing in air at normal temperature or the curing in water to be performed for the conventional concrete may be employed.

With the grading distribution of the respective powder material in this embodiment, the cement content, the amount of pozzolanic reactant material and the amount of aggregate to the cement, a smooth grading distribution curve can be obtained as shown by the cumulative grading curve of powder in FIG. 1. Accordingly, this cement matrix, which has a smooth grading distribution, can ensure a predetermined fluidity using a small amount of water and super plasticizer. Furthermore, since individual material is packed by closest packing in a hardening body (hydrate) obtained by hydration reaction of this cement matrix, thick and dense texture is formed and, therefore, mechanical characteristics such as the compressive strength, bond strength and tensile strength are enhanced and the durability is enhanced.

Moreover, fiber reinforced concrete obtained by this embodiment has mechanical characteristics such as a compressive strength measured with a cylindrical specimen of $\phi$ 10×20 cm of 200-220 N/mm$^2$, a flexural tensile strength measured with a flexural specimen of 4×4×16 cm of 40-50 N/mm$^2$, a tensile strength of initial occurrence of crack of 9-13 N/mm$^2$ and fracture energy by tension of 27-40 J/mm$^2$, and is superior in mechanical performance.

Moreover, the flow value measured by JISR5201 flow test (without dropping) is within a range of 22-26 cm, the consistency after mixing has sufficient self-compactability. Accordingly, since compaction with a vibrator is unnecessary and it is possible to place ultra-high-strength fiber reinforced concrete which is sufficiently dense only by casting the material, superior consistency or workability is obtained.

Moreover, with the fiber reinforced concrete according to this embodiment, since the cement content is limited and commonly used fine sand is adjusted and used as the aggregate, the material cost can be reduced by 10%-16% in comparison with conventional fiber reinforced concrete while having the same or higher mechanical characteristics and chemical characteristics.

Moreover, since the cement content is reduced, it becomes possible to reduce autogeneous shrinkage to be caused by volume decrease of hydrate in hydration reaction.

Moreover, since the maximum aggregate particle diameter is as comparatively large as 2.5 mm, it becomes possible to increase shear transfer by asperity formed by aggregate at a shear crack face in occurrence of an diagonal shear crack and to enhance ultimate shear yield strength.

Moreover, since the ratio ($L_m/D_{max}$) of the mean length $L_m$ of fiber to the maximum aggregate particle diameter $D_{max}$ is set to be smaller than 10, it becomes possible to enhance the toughness performance of concrete by sufficient bonding length and to ensure sufficient fluidity even for a small amount of water.

Moreover, with the mix proportion of cement, first pozzolanic reactant particles and second pozzolanic reactant particles, smooth cumulative grading of material particles is obtained and closest packing between the respective particles is achieved and, therefore, it becomes possible to generate a cement matrix having a dense structure including no pores.

Moreover, since the pore size distribution at 0.01 μm-0.1 μm, which effects the durability of the cement matrix, is extremely small, the chloride irons diffusion coefficient is as extremely small as 0.002 cm$^2$/year (chloride irons diffusion coefficient of high-strength concrete having a water-cement ratio of W/C=30% is 0.14 cm$^2$/year) and the water permeability coefficient is as extremely small as $4 \times 10^{-17}$ cm/s (water permeability coefficient of a water-cement ratio of W/C=30% is $1 \times 10_{11}$ cm/s) and, therefore, long-term superior durability is obtained. Accordingly, a structure to which the fiber reinforced concrete according to this embodiment is applied does not deteriorate under environment conditions harsh for a concrete structure, such as a marine environment or cold region, and, therefore, it becomes possible to reduce the maintenance and operation cost.

Moreover, regarding a fiber reinforced concrete member manufactured by a manufacturing method of the present invention, the second curing is performed by thermal curing so as to make the cement matrix denser. That is, by performing heat treatment as described above, free lime in cement and silica or alumina of pozzolanic reactant particles are bonded, stable and hard substance is formed at an early stage and the texture of the cement matrix is made dense. As a result, mechanical characteristics such as the compressive strength and the tensile strength are enhanced and, furthermore, the chloride irons diffusion coefficient and the water permeability coefficient is significantly decreased, hence the durability is enhanced. Moreover, by performing thermal curing, since hydration reaction of cement and water is completely terminated after the thermal curing, the pore liquid in the fiber reinforced concrete is consumed after the thermal curing and the drying shrinkage does not occur.

Furthermore, with the fiber reinforced concrete according to this embodiment having sufficient mechanical performance and durability, it becomes possible to apply the concrete to establishment of a structure without the need for reinforcement by rebar and to thin the member cross section. As a result, it becomes possible to reduce the structure's own weight to ½-⅙ in comparison with a structure using conventional reinforced concrete. Accordingly, when this fiber reinforced concrete is employed, for example, for superstructure work of a bridge, it becomes possible to reduce the size of erection facilities of superstructure work, substructures of underparts and the like, and to shorten the construction period and reduce the construction cost. Moreover, lowering of girder height and increasing of span length can be realized easily and economically.

The present invention has been explained by a suitable embodiment. However, it should be understood that the invention is not limited to the above respective embodiments and design of the above respective components can be changed arbitrarily without departing from the gist of the present invention.

For example, though the mixing step of the cement matrix in the above embodiment is a method for mixing only powder material, then introducing liquid material, further mixing the material and mixing fiber after a predetermined fluidity develops, the order of introduction of material in the mixing step is not limited and may be set arbitrarily.

Moreover, the weight ratio or the like of cement, pozzolanic reactant particles, aggregate and the like is not limited to the weight ratio of the above embodiment and may be set arbitrarily.

EXAMPLE (1) Durability

A comparison test of pore size distribution was performed as a verification experiment of durability performance of the fiber reinforced concrete according to the present invention.

Here, the steel corrosion proceeds when chloride ion, water and oxygen enters from outside and the carbonation of concrete occurs when carbon dioxide enters from outside. It is considered that such substance moves mainly by capillary phenomenon, and the pore size of a diameter of 7 nm-5000 nm is referred to as capillary pore. Therefore, in order to restrain progression of deterioration of concrete, it is only necessary to form concrete to have a dense texture for which chloride ion, water, oxygen, carbon dioxide and the like cannot enter. Accordingly, the durability performance of concrete is decided by the pore structure inside the matrix.

Figure 2:
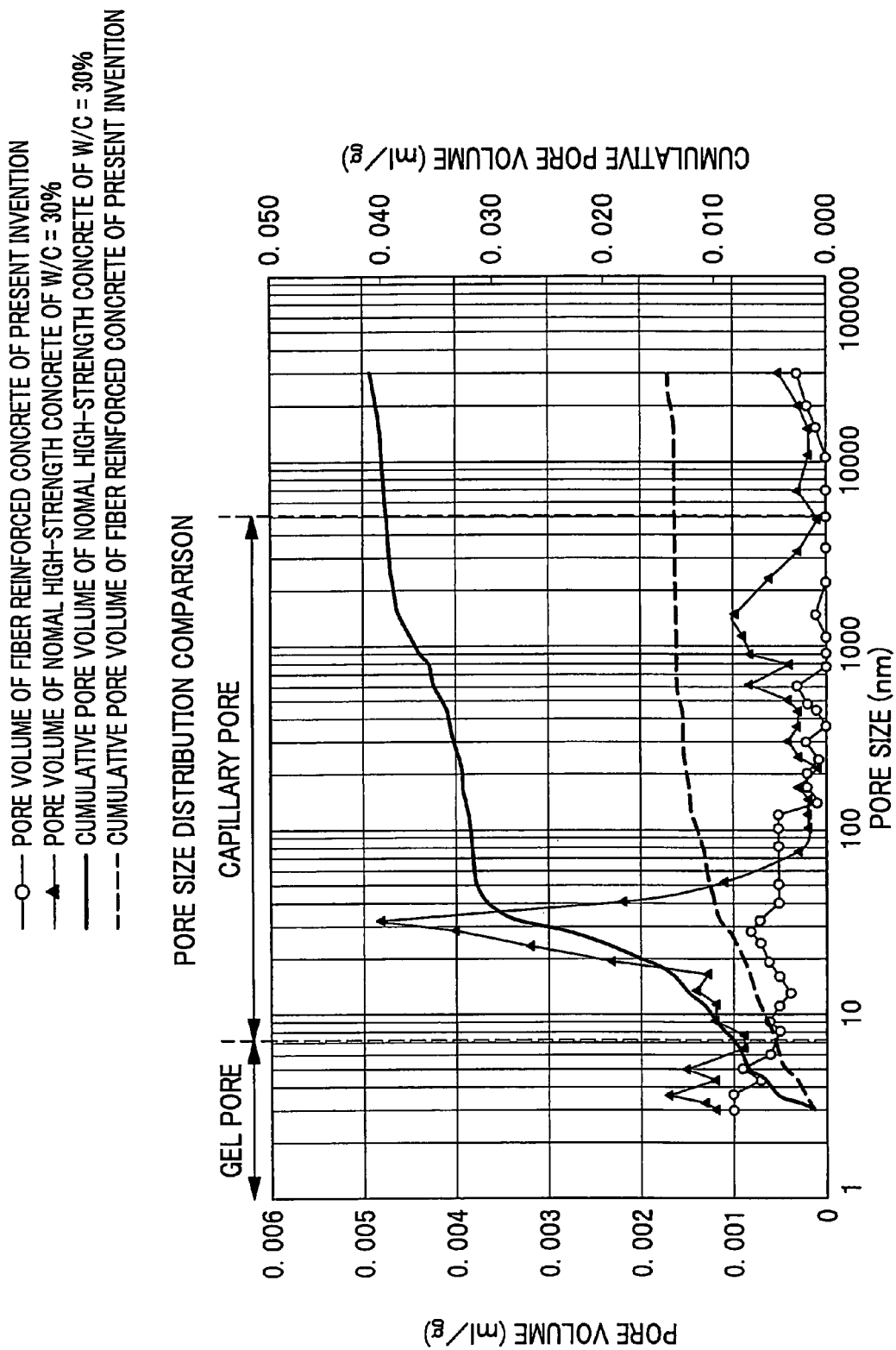
FIG. 2 is a graph showing distribution of pore volume and cumulative pore volume of fiber reinforced concrete of the present invention and conventional high-strength concrete, in which pore size is shown on the abscissa axis while pore volume and cumulative pore volume are shown on the ordinate axis.

In the present verification experiment, distribution of pore size volume and cumulative pore volume of the fiber reinforced concrete of the present invention and the conventional high-strength concrete (which may be hereinafter referred to simply as "high-strength concrete") having a water-cement ratio of 30% were compared. The result is shown in FIG. 2. It should be noted that FIG. 2 is a graph showing distribution of pore volume and cumulative pore volume of the fiber reinforced concrete and the high-strength concrete, in which the pore size is shown on the abscissa axis while the pore volume and cumulative pore volume are shown on the ordinate axis.

It is understood from FIG. 2 that the fiber reinforced concrete has an extremely small pore volume at capillary pore grading distribution zone in comparison with the high-strength concrete. Accordingly, it was proven that the fiber reinforced concrete according to the present invention is superior in durability.

(2) Autogeneous Shrinkage

Next, by changing the maximum aggregate particle diameter and the cement content to measure a change in height of specimen after casting, a verification experiment was performed with respect to the effect of the mix proportion of the fiber reinforced concrete of the present invention on reduction of autogeneous shrinkage.

The mix proportion of each cement matrix in the present verification experiment and the mechanical characteristics of concrete manufactured by the mix proportion are shown in Table 1. As shown in Table 1, the present verification experiment was performed for cement matrices manufactured by three types of mix proportions of Mix Proportion 1 and Mix Proportion 2, which were comparative examples, and Mix Proportion 3, which was the mix proportion of the fiber reinforced concrete of the present invention. The maximum aggregate particle diameter was 0.6 mm in Mix Proportion 1 and Mix Proportion 2 and it was 2.5 mm in Mix Proportion 3, and the cement content was 828 kg/m$^3$ in Mix Proportion 1 and it was 795 kg/m$^3$ in Mix Proportion 2 and Mix Proportion 3.

TABLE 1

MIX PROPORTION OF COMPARISON TEST ON AUTOGENEOUS SHRINKAGE

| MIX PROPORTION CASE | MIX PROPORTION 1 | MIX PROPORTION 2 | MIX PROPORTION 3 |
| --- | --- | --- | --- |
| CEMENT CONTENT (kg/m$^3$) | 828 | 795 | 795 |
| MAXIMUM AGGREGATE PARTICLE DIAMETER $D_{max}$ (mm) | 0.6 | 0.6 | 2.5 |
| WATER/CEMENT (WEIGHT %) | 22 | 22 | 22 |
| MIXED AMOUNT OF FIBER (vol. %) | 2 | 2 | 2 |
| FINE SAND/BINDER (WEIGHT %) | 55 | 55 | 55 |
| CEMENT/POZZOLANIC MATERIAL (WEIGHT %) | 155 | 139 | 139 |

TABLE 1-continued

MIX PROPORTION OF COMPARISON TEST ON AUTOGENEOUS SHRINKAGE

| MIX PROPORTION CASE | MIX PROPORTION 1 | MIX PROPORTION 2 | MIX PROPORTION 3 |
|---|---|---|---|
| MECHANICAL CHARACTERISTICS | | | |
| COMPRESSIVE STRENGTH (N/mm²) ϕ100 × 200 mm | 205 | 199 | 209 |
| FLEXURAL STRENGTH (N/mm²) 40 × 40 × 160 mm | 31.6 | 30.1 | 34.5 |
| SPLITTING STRENGTH (N/mm²) ϕ100 × 200 mm | 18.8 | 22.1 | 23.3 |

The test result of autogeneous shrinkage performed for a specimen manufactured by the mix proportions of Table 1 is shown in FIG. 3. Here, FIG. 3 is a graph showing the verification experiment result of autogeneous shrinkage, in which elapsed time is shown on the abscissa axis with the mixing starting time being set at zero while the rate of length change is shown on the ordinate axis with expansion being shown at plus and shrinkage being shown at minus.

Here, autogeneous shrinkage becomes problematic at an elapsed time of approximately 48 hours when initial strength develops and tensile stress due to restraint becomes problematic. When comparing the rate of shrinkage change at this collapsed time of approximately 48 hours, Mix Proportion 1 is highest as 0.095% while Mix Proportion 2 is approximately 0.050% and Mix Proportion 3 is approximately 0.038% as shown in FIG. 3. As a result, it was proven that Mix Proportion 3 (having a small cement content and a maximum aggregate particle diameter of 2.5 mm) according to the present invention has the smallest effect on autogeneous shrinkage. Moreover, it was proven that the splitting strength of Mix Proportion 1 is the smallest and effect on autogeneous shrinkage develops, when comparing mechanical characteristics of the respective mix proportions in Table 1.

(3) Consistency and Mechanical Characteristics

Next, a verification experiment with respect to effect of the relation between the length $L_m$ of fiber and the maximum aggregate particle diameter $D_{max}$ on the consistency (fluidity) and the mechanical characteristics of fiber reinforced concrete was performed for three types of mix proportions of Mix Proportion A, which was the mix proportion of the present invention, and Mix Proportion B and Mix Proportion C, which were comparative examples. The result is shown in Table 2. In the present verification experiment, as shown in Table 2, a flow test, a compression test, a bending test and a splitting test were implemented for the specimen of Mix Proportion A, Mix Proportion B and Mix Proportion C, which respectively have different strengths $L_m$ of fiber of 15 mm, 30 mm and 40 mm.

TABLE 2

EFFECT OF FIBER CONFIGURATION ON MATERIAL CHARACTERISTICS

| MIX PROPORTION CASE | MIX PROPORTION A | MIX PROPORTION B | MIX PROPORTION C |
|---|---|---|---|
| MAXIMUM AGGREGATE PARTICLE DIAMETER $D_{max}$ (mm) | 2.5 | 2.5 | 2.5 |
| MIXED AMOUNT OF FIBER (vol. %) | 2 | 2 | 2 |
| DIAMETER OF FIBER d (mm) | 0.2 | 0.2 | 0.3 |
| LENGTH OF FIBER $L_m$ (mm) | 15 | 30 | 40 |
| $R = L_m/D_{max}$ | 6 | 12 | 16 |
| ASPECT RATIO OF FIBER $L_m/d$ | 75 | 150 | 133 |
| CEMENT CONTENT (kg/m³) | 795 | 795 | 795 |
| WATER/CEMENT (WEIGHT %) | 22 | 22 | 22 |
| FINE SAND/BINDER (WEIGHT %) | 55 | 55 | 55 |
| CEMENT/POZZOLANIC MATERIAL (WEIGHT %) | 139 | 139 | 139 |
| FLOW VALUE (mm) | 250 | 210 | 195 |
| COMPRESSIVE STRENGTH (N/mm²) ϕ100 × 200 mm | 209 | 195 | 197 |
| FLEXURAL STRENGTH (N/mm²) 40 × 40 × 160 mm | 34.5 | 21.5 | 18.4 |
| SPLITTING STRENGTH (N/mm²) ϕ100 × 200 mm | 23.3 | 17.6 | 12.4 |

As shown in Table 2, since Mix Proportion B and Mix Proportion C have large lengths $L_m$ of fiber, the flow value indicative of the fluidity of concrete becomes small and, especially with Mix Proportion C, the flow value was 195 mm which means that self-compacting is impossible (in general, a flow value within a range of 220-260 mm is suitable for self-compacting). Moreover, the result shows that the effect of three types of mix proportions on the compressive strength is small, though the flexural strength and the splitting strength rapidly lower as the ratio R between the length $L_m$ of fiber and the maximum aggregate particle diameter $D_{max}$ is increased.

Accordingly, it was proven that the Mix Proportion A, which is the mix proportion of the present invention having a length $L_m$ of fiber larger than or equal to 2 mm and the ratio R between the length $L_m$ of fiber and the maximum aggregate particle diameter $D_m$ a smaller than 10, has the most superior consistency and mechanical characteristics.

(4) Fluidity and Mechanical Characteristics

Furthermore, a verification experiment on the relationship between the mixed amount of fiber and the fluidity and mechanical characteristics of concrete was performed for four types of mix proportions of Mix Proportion c, which was the mix proportion of the present invention, and Mix Proportion a, Mix Proportion b and Mix Proportion d, which were comparative examples. The result is shown in Table 3.

In the present verification experiment, as shown in Table 3, a flow value, a compressive strength, a flexural strength and a splitting strength were measured and compared with respect to specimen of Mix Proportion a, Mix Proportion b, Mix Proportion c and Mix Proportion d in which fiber of the same configuration is mixed in the same cement matrix respectively by 1.0%, 1.5%, 2.0% and 2.5% of the total volume.

TABLE 3

EFFECT OF MIXED AMOUNT OF FIBER ON MATERIAL CHARACTERISTICS

| MIX PROPORTION CASE | MIX PROPORTION a | MIX PROPORTION b | MIX PROPORTION c | MIX PROPORTION d |
|---|---|---|---|---|
| MAXIMUM AGGREGATE PARTICLE DIAMETER $D_{max}$ (mm) | 2.5 | 2.5 | 2.5 | 2.5 |
| MIXED AMOUNT OF FIBER (vol. %) | 1 | 1.5 | 2 | 2.5 |
| DIAMETER OF FIBER d (mm) | 0.2 | 0.2 | 0.2 | 0.2 |
| LENGTH OF FIBER $L_m$ (mm) | 15 | 15 | 15 | 15 |
| $R = L_m/D_{max}$ | 6 | 6 | 6 | 6 |
| ASPECT RATIO OF FIBER $L_m/d$ | 75 | 75 | 75 | 75 |
| CEMENT CONTENT (kg/m$^3$) | 795 | 795 | 795 | 795 |
| WATER/CEMENT (WEIGHT %) | 22 | 22 | 22 | 22 |
| FINE SAND/BINDER (WEIGHT %) | 55 | 55 | 55 | 55 |
| CEMENT/POZZOLANIC MATERIAL (WEIGHT %) | 139 | 139 | 139 | 139 |
| FLOW VALUE (mm) | 255 | 252 | 250 | 232 |
| COMPRESSIVE STRENGTH (N/mm$^2$) φ100 × 200 mm | 205 | 212 | 209 | 204 |
| FLEXURAL STRENGTH (N/mm$^2$) 40 × 40 × 160 mm | 21.1 | 30.2 | 34.5 | 34.5 |
| SPLITTING STRENGTH (N/mm$^2$) φ100 × 200 mm | 18.2 | 20.5 | 23.3 | 23.5 |

As shown in Table 3, the characteristics were shown that the flow value and the compressive strength are free of marked change, though the flexural strength and the splitting strength are increased as the mixed amount of fiber is increased. It was, however, proven that there was no large deference between the Mix Proportion c and the Mix Proportion d as regards the flexural strength and the splitting strength thereof and, therefore, the most suitable mixed amount of fiber was approximately 2.0% in terms of cost performance.

What is claimed is:

1. A fiber reinforced concrete, comprising:
    fiber included in a dispersed manner in a cement matrix;
    cement;
    first pozzolanic reactant particles;
    second pozzolanic reactant particles composed of any one of fly ash, blast furnace slag and volcanic ash, the second pozzolanic reactant particles having a reactivity lower than the first pozzolanic reactant particles, and the second pozzolanic reactant particles having a median diameter $D_{50}$ of 2 μm to 11 μm;
    first aggregate particles composed of any one of hard fine sand, sea sand, river sand and crushed sand composed of andesite, volcanic rock, and quartzite, the first aggregate particles having a maximum particle diameter smaller than or equal to 2.5 mm, a mean particle diameter within a range of 0.4 mm to 0.8 mm and a fineness modulus within a range of 1.5 to 3.5;
    second aggregate particles composed of any one of quartz powder, fine sand, silica sand, amorphous quartz, opaline silica-containing powder, cristobalite powder and rock powder, the second aggregate particles having a maximum particle diameter smaller than or equal to 0.425 mm, a mean particle diameter within a range of 0.1 mm to 0.3 mm and a fineness modulus within a range of 0.4 to 0.8;
    at least one plasticizer; and
    water.

2. The fiber reinforced concrete according to claim 1, wherein
    a weight ratio of water to the cement is within a range of 20% to 24%,
    a ratio of a mean length of the fiber to a maximum particle diameter of aggregate composed of the first aggregate particles and the second aggregate particles is smaller than 10, and
    an amount of the fiber to a total volume after setting is smaller than 4%.

3. The fiber reinforced concrete according to claim 2, wherein the fiber has a length larger than or equal to 2 mm and a ratio of a length to a diameter of the fiber larger than or equal to 20.

4. The fiber reinforced concrete according to claim 2, wherein
    a weight ratio of the water to a total weight of the cement, the first pozzolanic reactant particles and the second pozzolanic reactant particles is within a range of 10% to 15%, and a $D_{75}$ grading is within a range of 50 μm to 300 μm and a $D_{50}$ grading is within a range of 10 μm to 70 μm, of grading components of the mixture composed of the cement, the first pozzolanic reactant particles, the second pozzolanic reactant particles, the first aggregate particles and the second aggregate particles.

5. The fiber reinforced concrete according to claim 3, wherein
a weight ratio of the water to a total weight of the cement, the first pozzolanic reactant particles and the second pozzolanic reactant particles is within a range of 10% to 15%, and
a $D_{75}$ grading is within a range of 50 μm to 300 μm and a $D_{50}$ grading is within a range of 10 μm to 70 μm, of grading components of the mixture composed of the cement, the first pozzolanic reactant particles, the second pozzolanic reactant particles, the first aggregate particles and the second aggregate particles.

6. The fiber reinforced concrete according to claim 2, wherein
a weight ratio of the cement to the mixture composed of the cement, the first pozzolanic reactant particles, the second pozzolanic reactant particles, the first aggregate particles and the second aggregate particles is within a range of 30% to 40%,
a weight ratio of pozzolanic reactant material composed of the first pozzolanic reactant particles and the second pozzolanic reactant particles to the mixture composed of the cement, the first pozzolanic reactant particles, the second pozzolanic reactant particles, the first aggregate particles and the second aggregate particles is within a range of 20% to 40%, and
a weight ratio of the aggregate to the cement is within a range of 80% to 130%.

7. The fiber reinforced concrete according to claim 3, wherein
a weight ratio of the cement to the mixture composed of the cement, the first pozzolanic reactant particles, the second pozzolanic reactant particles, the first aggregate particles and the second aggregate particles is within a range of 30% to 40%,
a weight ratio of pozzolanic reactant material composed of the first pozzolanic reactant particles and the second pozzolanic reactant particles to the mixture composed of the cement, the first pozzolanic reactant particles, the second pozzolanic reactant particles, the first aggregate particles and the second aggregate particles is within a range of 20% to 40%, and
a weight ratio of the aggregate to the cement is within a range of 80% to 130%.

8. The fiber reinforced concrete according to claim 4, wherein
a weight ratio of the cement to the mixture composed of the cement, the first pozzolanic reactant particles, the second pozzolanic reactant particles, the first aggregate particles and the second aggregate particles is within a range of 30% to 40%,
a weight ratio of pozzolanic reactant material composed of the first pozzolanic reactant particles and the second pozzolanic reactant particles to the mixture composed of the cement, the first pozzolanic reactant particles, the second pozzolanic reactant particles, the first aggregate particles and the second aggregate particles is within a range of 20% to 40%, and
a weight ratio of the aggregate to the cement is within a range of 80% to 130%.

9. The fiber reinforced concrete according to claim 5, wherein
a weight ratio of the cement to the mixture composed of the cement, the first pozzolanic reactant particles, the second pozzolanic reactant particles, the first aggregate particles and the second aggregate particles is within a range of 30% to 40%,
a weight ratio of pozzolanic reactant material composed of the first pozzolanic reactant particles and the second pozzolanic reactant particles to the mixture composed of the cement, the first pozzolanic reactant particles, the second pozzolanic reactant particles, the first aggregate particles and the second aggregate particles is within a range of 20% to 40%, and
a weight ratio of the aggregate to the cement is within a range of 80% to 130%.

10. The fiber reinforced concrete according to any one of claims 1 to 9, wherein a weight ratio of the first aggregate particles to the mixture composed of the cement, the first pozzolanic reactant particles, the second pozzolanic reactant particles, the first aggregate particles and the second aggregate particles is within a range of 30% to 50%.

11. A method of manufacturing a fiber reinforced concrete member, comprising:
a mixing step of mixing:
cement;
first pozzolanic reactant particles;
second pozzolanic reactant particles composed of any one of fly ash, blast furnace slag or volcanic ash, the second pozzolanic reactant particles having a reactivity lower than the first pozzolanic reactant particles, and the second pozzolanic particles having a median diameter $D_{50}$ of 2 μm to 11 μm;
first aggregate particles composed of any one of hard fine sand, sea sand, river sand and crushed sand composed of andesite, volcanic rock, and quartzite, the first aggregate particles having a maximum particle diameter smaller than or equal to 2.5 mm, a mean particle diameter within a range of 0.4 mm to 0.8 mm and a fineness modulus within a range of 1.5 to 3.5;
second aggregate particles composed of any one of quartz powder, fine sand, silica sand, amorphous quartz, opaline silica-containing powder, cristobalite powder and rock powder, the second aggregate particles having a maximum particle diameter smaller than or equal to 0.425 mm, a mean particle diameter within a range of 0.1 mm to 0.3 mm and a fineness modulus within a range of 0.4 to 0.8;
at least one plasticizer;
water; and
fiber to generate fiber reinforced concrete;
a casting step of casting the mixed fiber reinforced concrete at a location; and
a curing step of curing the cast fiber reinforced concrete, wherein the curing step comprises: first curing to be performed with a formwork being attached until a target strength develops; and second curing to be performed with the formwork being detached after the first curing.

12. The method of manufacturing a fiber reinforced concrete member according to claim 11, wherein the second curing is performed in a temperature environment within a range of 60° C. to 95° C. for 48 hours to 72 hours.

* * * * *